United States Patent
Corman et al.

(10) Patent No.: US 11,349,223 B2
(45) Date of Patent: May 31, 2022

(54) LAMINAR PHASED ARRAY WITH POLARIZATION-ISOLATED TRANSMIT/RECEIVE INTERFACES

(71) Applicant: Anokiwave, Inc., San Diego, CA (US)

(72) Inventors: David W. Corman, Gilbert, AZ (US); Vipul Jain, Irvine, CA (US); Timothy Carey, San Diego, CA (US); Nitin Jain, San Diego, CA (US)

(73) Assignee: Anokiwave, Inc., San Diego, CA (US)

( * ) Notice: Subject to any disclaimer, the term of this patent is extended or adjusted under 35 U.S.C. 154(b) by 18 days.

(21) Appl. No.: 17/232,283

(22) Filed: Apr. 16, 2021

(65) Prior Publication Data

US 2021/0320427 A1    Oct. 14, 2021

Related U.S. Application Data (63) Continuation of application No. 15/267,704, filed on Sep. 16, 2016, now Pat. No. 11,011,853.
(Continued)

(51) Int. Cl.
*H01Q 21/06* (2006.01)
*H01Q 21/24* (2006.01)
(Continued)

(52) U.S. Cl.
CPC ......... *H01Q 21/065* (2013.01); *H01Q 1/2283* (2013.01); *H01Q 1/245* (2013.01);
(Continued)

(58) Field of Classification Search
None
See application file for complete search history.

(56) References Cited

U.S. PATENT DOCUMENTS

| 2,982,959 | A | 5/1961 | Hanneken |
| 3,483,563 | A | 12/1969 | Schroeder |

(Continued)

FOREIGN PATENT DOCUMENTS

| WO | 1995025409 A1 | 9/1995 |
| WO | 2017185979 A1 | 11/2017 |

(Continued)

OTHER PUBLICATIONS

Bailey, "General Layout Guidelines for RF and Mixed-Signal PCBs," Maxim Integrated, Tutorial 5100, 10 pages, Sep. 14, 2011.
(Continued)

*Primary Examiner* — Ab Salam Alkassim, Jr.
(74) *Attorney, Agent, or Firm* — Nutter McClennen & Fish LLP (57) ABSTRACT

A phased array includes a laminar substrate having both 1) a plurality of elements forming a patch phased array, and 2) a plurality of integrated circuits. Each integrated circuit is configured to control receipt and transmission of signals by the plurality of elements in the patch phased array. The integrated circuits also are configured to operate the phased array at one or more satellite frequencies—to transmit signals to and/or receive signals from a satellite. Each integrated circuit physically couples with one corresponding element so that incoming signals are received by the corresponding element in a first polarization, and outgoing signals are transmitted by the corresponding element in a second polarization. The phased array isolates the transmit signals from the receive signals by orienting the first and second polarizations differently.

22 Claims, 8 Drawing Sheets

Related U.S. Application Data (60) Provisional application No. 62/220,522, filed on Sep. 18, 2015.

(51) Int. Cl.

| | | |
|---|---|---|
| *H01Q 3/26* | (2006.01) | |
| *H04L 5/14* | (2006.01) | |
| *H04L 5/16* | (2006.01) | |
| *H01Q 1/22* | (2006.01) | |
| *H01Q 1/24* | (2006.01) | |
| *H01Q 1/38* | (2006.01) | |
| *H01Q 3/38* | (2006.01) | |
| *H01Q 21/22* | (2006.01) | |

(52) U.S. Cl.
CPC .............. *H01Q 1/38* (2013.01); *H01Q 3/26* (2013.01); *H01Q 3/38* (2013.01); *H01Q 21/22* (2013.01); *H01Q 21/24* (2013.01); *H04L 5/1469* (2013.01); *H04L 5/16* (2013.01)

(56) References Cited

U.S. PATENT DOCUMENTS

| | | | |
|---|---|---|---|
| 5,027,125 A | 6/1991 | Tang | |
| 5,068,668 A | 11/1991 | Tsuda et al. | |
| 5,223,848 A * | 6/1993 | Rammos | H01Q 9/0407 343/700 MS |
| 5,381,157 A | 1/1995 | Shiga | |
| 5,382,959 A * | 1/1995 | Pett | H01Q 21/065 343/700 MS |
| 5,448,250 A | 9/1995 | Day | |
| 5,554,995 A | 9/1996 | Jun | |
| 5,568,158 A | 10/1996 | Gould | |
| 5,648,955 A | 7/1997 | Jensen et al. | |
| 5,724,666 A | 3/1998 | Dent | |
| 5,949,376 A | 9/1999 | McDonald et al. | |
| 5,959,980 A | 9/1999 | Scott | |
| 5,969,681 A * | 10/1999 | O'Neill, Jr. | H01Q 9/0428 343/700 MS |
| 5,982,329 A | 11/1999 | Pittman et al. | |
| 6,002,370 A | 12/1999 | Mckinnon et al. | |
| 6,067,053 A | 5/2000 | Runyon et al. | |
| 6,166,705 A | 12/2000 | Mast et al. | |
| 6,252,559 B1 | 6/2001 | Donn | |
| 6,411,258 B1 | 6/2002 | Ho | |
| 6,411,824 B1 | 6/2002 | Eidson | |
| 6,519,478 B1 | 2/2003 | Scherzer et al. | |
| 6,611,231 B2 | 8/2003 | Crilly, Jr. et al. | |
| 6,686,885 B1 | 2/2004 | Barkdoll et al. | |
| 6,760,603 B1 | 7/2004 | Scherzer et al. | |
| 6,995,712 B2 | 2/2006 | Boyanov | |
| 7,027,454 B2 | 4/2006 | Dent | |
| 7,062,245 B2 | 6/2006 | Miyano et al. | |
| 7,079,869 B2 * | 7/2006 | Aytur | H01Q 21/00 455/562.1 |
| 7,087,993 B2 | 8/2006 | Lee | |
| 7,129,568 B2 | 10/2006 | Lee et al. | |
| 7,327,317 B2 | 2/2008 | Heiniger | |
| 7,372,911 B1 | 5/2008 | Lindskog et al. | |
| 7,538,740 B2 | 5/2009 | Korisch et al. | |
| 7,656,342 B2 | 2/2010 | Stolarczyk et al. | |
| 7,894,768 B2 | 2/2011 | Ding et al. | |
| 8,031,117 B2 | 10/2011 | Goldberg | |
| 8,098,198 B2 | 1/2012 | Thiesen et al. | |
| 8,120,537 B2 | 2/2012 | del Rio et al. | |
| 8,160,530 B2 | 4/2012 | Corman et al. | |
| 8,185,162 B2 * | 5/2012 | Haskell | H01Q 1/246 455/562.1 |
| 8,352,040 B2 | 1/2013 | Von Arx et al. | |
| 8,385,305 B1 | 2/2013 | Negus et al. | |
| 8,558,398 B1 | 10/2013 | Seetharam | |
| 8,558,735 B2 | 10/2013 | Bachmann et al. | |
| 8,587,492 B2 | 11/2013 | Runyon | |
| 8,633,856 B2 | 1/2014 | Rao | |
| 8,649,418 B1 | 2/2014 | Negus et al. | |
| 8,665,846 B2 | 3/2014 | O'Keefe | |
| 8,737,190 B2 | 5/2014 | Yong et al. | |
| 8,792,820 B2 | 7/2014 | Grotz | |
| 8,817,672 B2 | 8/2014 | Corman et al. | |
| 8,838,036 B2 | 9/2014 | Yoon et al. | |
| 8,866,283 B2 | 10/2014 | Chen et al. | |
| 8,872,719 B2 | 10/2014 | Warnick | |
| 8,989,762 B1 | 3/2015 | Negus et al. | |
| 9,077,413 B2 | 7/2015 | Hawryluck et al. | |
| 9,088,388 B2 | 7/2015 | Alamouti et al. | |
| 9,094,102 B2 | 7/2015 | Corman et al. | |
| 9,112,262 B2 * | 8/2015 | Warnick | H01P 11/00 |
| 9,118,361 B2 | 8/2015 | Barker et al. | |
| 9,203,161 B2 | 12/2015 | Orihashi et al. | |
| 9,276,321 B2 | 3/2016 | Smith et al. | |
| 9,285,461 B2 | 3/2016 | Swirhun et al. | |
| 9,293,835 B2 | 3/2016 | Clymer et al. | |
| 9,306,291 B2 | 4/2016 | Lu et al. | |
| 9,368,880 B2 | 6/2016 | Solondz | |
| 9,520,637 B2 | 12/2016 | Monte et al. | |
| 9,520,655 B2 | 12/2016 | Cerreno | |
| 9,680,234 B2 | 6/2017 | Love et al. | |
| 9,705,611 B1 | 7/2017 | West | |
| 9,712,216 B2 | 7/2017 | Lea et al. | |
| 9,753,118 B2 | 9/2017 | Sanderovich et al. | |
| 9,768,513 B2 | 9/2017 | Lee et al. | |
| 9,806,422 B2 | 10/2017 | Garcia et al. | |
| 9,853,358 B2 | 12/2017 | Wu et al. | |
| 9,929,886 B2 | 3/2018 | Amadjikpe et al. | |
| 9,935,663 B1 | 4/2018 | Rofougaran et al. | |
| 10,020,555 B2 | 7/2018 | Sarkar et al. | |
| 10,116,066 B2 | 10/2018 | Schaepperle | |
| 10,135,501 B2 | 11/2018 | Lea et al. | |
| 10,181,888 B2 | 1/2019 | Wei et al. | |
| 10,218,426 B1 | 2/2019 | Sano et al. | |
| 10,298,275 B2 | 5/2019 | Gharavi et al. | |
| 10,439,675 B2 | 10/2019 | Johnson et al. | |
| 10,468,781 B1 | 11/2019 | Paulsen et al. | |
| 10,686,258 B2 | 6/2020 | Zihir et al. | |
| 10,742,288 B2 | 8/2020 | McMorrow et al. | |
| 10,826,195 B2 | 11/2020 | Madsen et al. | |
| 10,854,995 B2 | 12/2020 | Rofougaran et al. | |
| 10,998,640 B2 | 5/2021 | Carey et al. | |
| 11,011,853 B2 | 5/2021 | Corman et al. | |
| 11,205,858 B1 * | 12/2021 | Durbin | H01Q 3/24 |
| 2002/0102948 A1 | 8/2002 | Stanwood et al. | |
| 2004/0157645 A1 | 8/2004 | Smith et al. | |
| 2005/0017352 A1 | 1/2005 | Lee | |
| 2005/0063353 A1 | 3/2005 | Anderson et al. | |
| 2005/0082645 A1 | 4/2005 | Lee et al. | |
| 2005/0098860 A1 | 5/2005 | Lai et al. | |
| 2005/0243527 A1 | 11/2005 | Jandzio et al. | |
| 2006/0006505 A1 | 1/2006 | Chiang et al. | |
| 2006/0014491 A1 | 1/2006 | Cleveland | |
| 2007/0152882 A1 | 7/2007 | Hash et al. | |
| 2007/0274249 A1 | 11/2007 | Hulbert et al. | |
| 2008/0119190 A1 | 5/2008 | Karabinis | |
| 2008/0150800 A1 | 6/2008 | Tsuji | |
| 2008/0218424 A1 | 9/2008 | Blanton | |
| 2008/0246680 A1 | 10/2008 | Rawnick et al. | |
| 2009/0009404 A1 * | 1/2009 | Buer | H01Q 21/28 343/700 MS |
| 2009/0009408 A1 * | 1/2009 | Rofougaran | H01L 25/16 343/702 |
| 2009/0009417 A1 * | 1/2009 | Matsushita | H01Q 3/24 343/770 |
| 2009/0102740 A1 * | 4/2009 | Rofougaran | H01L 25/0657 343/860 |
| 2009/0117855 A1 * | 5/2009 | Rofougaran | H01Q 1/2283 455/73 |
| 2009/0256752 A1 | 10/2009 | Akkermans et al. | |
| 2010/0099370 A1 | 4/2010 | Nichols et al. | |
| 2010/0164783 A1 * | 7/2010 | Choudhury | H01Q 21/065 342/175 |
| 2010/0194663 A1 | 8/2010 | Rothwell et al. | |
| 2010/0202565 A1 * | 8/2010 | Abbasfar | H04L 27/2014 375/308 |
| 2010/0260076 A1 | 10/2010 | Corman et al. | |

(56) References Cited

U.S. PATENT DOCUMENTS

| | | | |
|---|---|---|---|
| 2010/0261440 A1 | 10/2010 | Corman et al. | |
| 2011/0001678 A1 | 1/2011 | Hsu et al. | |
| 2011/0090129 A1 | 4/2011 | Weily et al. | |
| 2011/0175789 A1 | 7/2011 | Lee et al. | |
| 2011/0198742 A1 | 8/2011 | Danno et al. | |
| 2011/0267998 A1 | 11/2011 | Meharry et al. | |
| 2011/0316745 A1 | 12/2011 | Yin | |
| 2012/0127034 A1 | 5/2012 | DiFonzo | |
| 2012/0133557 A1* | 5/2012 | Beaudin | H01Q 1/12 342/368 |
| 2012/0306698 A1* | 12/2012 | Warnick | H01Q 21/065 342/372 |
| 2012/0313219 A1 | 12/2012 | Chen et al. | |
| 2013/0050055 A1 | 2/2013 | Paradiso et al. | |
| 2013/0057449 A1 | 3/2013 | Orihashi et al. | |
| 2013/0069831 A1* | 3/2013 | Friedman | H01Q 21/061 343/702 |
| 2013/0072125 A1 | 3/2013 | Yoon et al. | |
| 2013/0088381 A1 | 4/2013 | Puzella et al. | |
| 2013/0088391 A1 | 4/2013 | Corman et al. | |
| 2013/0187830 A1 | 7/2013 | Warnick et al. | |
| 2014/0111373 A1 | 4/2014 | Puzella et al. | |
| 2014/0210668 A1 | 7/2014 | Wang et al. | |
| 2014/0255040 A1 | 9/2014 | Fujita et al. | |
| 2014/0266897 A1 | 9/2014 | Jakoby et al. | |
| 2014/0266902 A1 | 9/2014 | Kamgaing et al. | |
| 2014/0348035 A1 | 11/2014 | Corman et al. | |
| 2015/0016561 A1 | 1/2015 | Negus et al. | |
| 2015/0022411 A1* | 1/2015 | Ali | H01Q 9/16 343/793 |
| 2015/0116177 A1 | 4/2015 | Powell et al. | |
| 2015/0171523 A1 | 6/2015 | Kamgaing et al. | |
| 2015/0195001 A1* | 7/2015 | Barker | H04B 7/0617 342/367 |
| 2015/0234035 A1 | 8/2015 | Lohoefener et al. | |
| 2015/0241552 A1 | 8/2015 | Mohamadi | |
| 2015/0263424 A1 | 9/2015 | Sanford et al. | |
| 2015/0362583 A1 | 12/2015 | Ainspan et al. | |
| 2016/0020844 A1 | 1/2016 | Hart et al. | |
| 2016/0049723 A1* | 2/2016 | Baks | H01Q 1/2291 343/848 |
| 2016/0056544 A1 | 2/2016 | Garcia et al. | |
| 2016/0141757 A1 | 5/2016 | Lai et al. | |
| 2016/0149302 A1* | 5/2016 | Sanderovich | H01Q 3/24 343/703 |
| 2016/0218425 A1* | 7/2016 | Mohamadi | H01Q 21/065 |
| 2016/0218429 A1 | 7/2016 | Klemes | |
| 2016/0226142 A1 | 8/2016 | Leroux | |
| 2016/0226155 A1* | 8/2016 | Warnick | H01Q 21/0075 |
| 2016/0248157 A1 | 8/2016 | Rao et al. | |
| 2016/0277078 A1 | 9/2016 | Trotta | |
| 2016/0352012 A1* | 12/2016 | Foo | H04B 7/0452 |
| 2017/0025749 A1* | 1/2017 | Frye | H01Q 21/22 |
| 2017/0062910 A1 | 3/2017 | Iida | |
| 2017/0062926 A1 | 3/2017 | Bonebright et al. | |
| 2017/0085006 A1 | 3/2017 | Corman et al. | |
| 2017/0126302 A1* | 5/2017 | Sanderovich | H04B 7/0682 |
| 2017/0194703 A1 | 7/2017 | Watson | |
| 2017/0229785 A1 | 8/2017 | Fu et al. | |
| 2017/0237180 A1 | 8/2017 | Corman et al. | |
| 2017/0302003 A1 | 10/2017 | Elsallal et al. | |
| 2017/0353338 A1 | 12/2017 | Amadjikpe et al. | |
| 2018/0019804 A1 | 1/2018 | Buer et al. | |
| 2018/0054005 A1 | 2/2018 | Jain et al. | |
| 2018/0069309 A1 | 3/2018 | Friedman et al. | |
| 2018/0090814 A1 | 3/2018 | Yoon et al. | |
| 2018/0109404 A1 | 4/2018 | Yoon et al. | |
| 2018/0115087 A1 | 4/2018 | Besoli et al. | |
| 2018/0175476 A1 | 6/2018 | Teshiba et al. | |
| 2018/0183504 A1 | 6/2018 | McMorrow et al. | |
| 2018/0219283 A1 | 8/2018 | Wilkins et al. | |
| 2018/0234119 A1 | 8/2018 | Gharavi et al. | |
| 2018/0287266 A1 | 10/2018 | Madsen et al. | |
| 2018/0294826 A1 | 10/2018 | Fouche et al. | |
| 2018/0337739 A1 | 11/2018 | Petersson et al. | |
| 2019/0173538 A1 | 6/2019 | Wu et al. | |
| 2019/0334253 A1* | 10/2019 | Corman | H01Q 1/27 |
| 2019/0356057 A1* | 11/2019 | Carey | H01Q 3/30 |
| 2020/0036103 A1 | 1/2020 | Ariumi | |
| 2020/0145265 A1 | 5/2020 | Fleizach | |

FOREIGN PATENT DOCUMENTS

| | | |
|---|---|---|
| WO | 2018028310 A1 | 2/2018 |
| WO | 2018/119153 A2 | 6/2018 |

OTHER PUBLICATIONS

European Patent Office—Extended European Search Report,—EP Application No. 16862647.1, dated Aug. 6, 2019, 7 pages.

International Search Report and Written Opinion for International Application No. PCT/US2018/067449, dated Apr. 30, 2019 (16 pages).

International Searching Authority—International Search Report—International Application No. PCT/US2016/052215, dated May 29, 2017, together with the Written Opinion of the International Searching Authority, 16 pages.

Ismail—Introduction to RF CMOS IC Design for Wireless Applications, Analog VLSI Lab, The Ohio State University, 117 pages, Dec. 11, 2001.

Jain—Layout Review Techniques for Low RF Designs, Application Note AN098, Texas Instruments, 14 Pages, 2012.

Maxim,—"5GHz, 4-Channel MIMO Transmitter", MAX2850, Maxim Integrated Products, Inc., 33 pages, 2010.

Silicon Labs—Layout Design Guide for Si4455/435x RF Ics, AN685, Silicon Laboratories, 22 pages, 2014.

Ku, B., et al. "A High Linearity 76&85-GHz 16-Element 8-Transmit/8 Receive Phased-Array Chip With High Isolation and Flip-Chip Packaging", IEEE Transactions on Microwave Theory and Techniques, vol. 62, No. 10, Oct. 2014, 20 pages.

Townley, A., et al.—"A 94GHz 4TX-4RX Phased Array for FMCW Radar with Integrated LO and Flip-Chip Antenna Package", 2016 IEEE Radio Frequency Integrated Circuits Symposium, 2016, 4 pages.

* cited by examiner

LAMINAR PHASED ARRAY WITH POLARIZATION-ISOLATED TRANSMIT/RECEIVE INTERFACES

PRIORITY

This patent application is a continuation of U.S. patent application Ser. No. 15/267,704 filed Sep. 16, 2016, which claims priority from provisional U.S. Patent Application No. 62/220,522 filed Sep. 18, 2015, entitled, "LAMINAR PHASED ARRAY ANTENNA," and naming David Corman, Vipul Jain, Timothy Carey, and Nitin Jain as inventors, the disclosures of which are incorporated herein, in their entireties, by reference.

RELATED APPLICATIONS

This patent application is related to U.S. patent application Ser. No. 15/267,689 filed Sep. 16, 2016, entitled, "LAMINAR PHASED ARRAY ANTENNA," and naming David Corman, Vipul Jain, Timothy Carey, and Nitin Jain as inventors, the disclosure of which is incorporated herein, in its entirety, by reference.

FIELD OF THE INVENTION

The invention generally relates to phased array systems and, more particularly, the invention relates to laminar phased arrays/patch arrays.

BACKGROUND OF THE INVENTION

Antennas that emit electronically steered beams are known in the art as "phased array antennas." Such antennas are used worldwide in a wide variety of commercial and radar applications. They typically are produced from many small radiating elements that are individually phase controlled to form a beam in the far field of the antenna.

Among other things, phased array antennas are popular due to their ability to rapidly steer beams without requiring moving parts. One problem, however, is their cost. They can cost on the order of $1000 per element. Thus, for a 1000 element array, the cost can reach or exceed $1,000,000.

SUMMARY OF VARIOUS EMBODIMENTS

In accordance with one embodiment of the invention, a phased array includes a laminar substrate having both 1) a plurality of elements forming a patch phased array, and 2) a plurality of integrated circuits. Each integrated circuit is configured to control receipt and transmission of signals by the plurality of elements in the patch phased array. The integrated circuits also are configured to operate the phased array at one or more satellite frequencies—to transmit signals to and/or receive signals from a satellite. Preferred embodiments of each integrated circuit physically couple with one corresponding element so that incoming signals are received by the corresponding element in a first polarization, and outgoing signals are transmitted by the corresponding element in a second polarization. The phased array isolates the transmit signals from the receive signals by orienting the first and second polarizations differently.

As an example, the first polarization may be orthogonal to the second polarization (e.g., one may be horizontally polarized while the other may be vertically polarized). To that end, in some embodiments, the corresponding element includes a first side, and a second side physically orthogonal to the first side. In that case, each integrated circuit may have an IC receive interface physically coupled with the first side, and an IC transmit interface physically coupled with the second side. The physical coupling typically involves an intervening component to make the connection. Among other ways, the substrate may have a plurality of transmission lines that each physically couple one (or more) of the elements to its corresponding element.

Some embodiments couple a single integrated circuit with more than one corresponding element. To that end, the integrated circuit may be physically coupled with a second corresponding element so that incoming signals are received by the second corresponding element in the first polarization, and outgoing signals are transmitted by the second corresponding element in the second polarization.

To further isolate the transmission and receive sides of the element, the integrated circuits may be configured to use duplex waveforms to transmit and receive signals via the plurality of elements. In that case, the integrated circuits preferably are configured to use half-wave duplex waveforms to transmit and receive signals via the plurality of elements. For example, the integrated circuits may be configured to use time-division duplex waveforms or frequency-division duplex waveforms to transmit and receive signals via the plurality of elements.

The plurality of elements may take on any of a variety of forms on the substrate, such as those of a triangular, rectangular, or hexagonal lattice. Moreover, some of the integrated circuits, which may be flip-chip bonded to the substrate, preferably are positioned on the substrate between at least two elements. To provide more structural protection and filter certain frequencies, the phased array also may position a polarizer between the substrate and a radome.

The plurality of integrated circuits may be configured to operate the phased array to communicate with other devices (e.g., devices not in space, such as smartphones) using 5G protocols.

In accordance with another embodiment, a phased array includes a laminar substrate having both 1) a plurality of elements forming a patch phased array, and 2) a plurality of integrated circuits. Each element includes an element receive interface and a separate element transmit interface. Each element receive interface is polarized differently with each element transmit interface to isolate the element receive interface from the element transmit interface. In a corresponding manner, each integrated circuit is configured to control receipt and transmission of signals by the plurality of elements in the patch phased array. To that end, each integrated circuit includes an IC receive interface and a separate IC transmit interface.

The laminar substrate may be considered to form a plurality of element sets. Specifically, each element set includes a single integrated circuit and a first given element of the plurality of elements. The element sets do not share elements—i.e., no two of the plurality of element sets include the same first given element. The element receive interface of the first given element is electrically connected with the IC receive interface of the single integrated circuit. In a corresponding manner, the element transmit interface of the first given element is electrically connected (e.g., using a transmission line or trace) with the IC transmit interface of the single integrated circuit.

In another embodiment, the element is followed by frequency diplexer that splits the signal into a first frequency signal and a second frequency signal. Each of the generated frequency signals is then routed to its own independent circuit that either receives or transmits to or from the antenna element.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a phased array transmits and receives signals to/from satellites without certain prior art required circuitry that increases the array footprint and cost. Moreover, eliminating that circuitry can improve the signals by reducing noise and improving gain. To that end, the phased array has a plurality of patch antenna elements ("elements"), and an array of integrated circuits that each controls at least two of the elements. Each integrated circuit has separate transmit and receive interfaces for each element it controls. For example, if a given integrated circuit controls two elements, it has a first pair of transmit and receive interfaces for the first element, and a second pair of transmit and receive interfaces for the second element.

Each transmit interface and receive interface on an integrated circuit respectively couples to corresponding transmit and receive interfaces on one of the elements. To provide signal isolation, the two interfaces on each element are polarized out of phase with each other. For example, a given element's transmit interface may be about 90 degrees out of phase with its receive interface. This interface scheme favorably eliminates the need for one of the switches prior art integrated circuits use for these purposes. As such, the integrated circuit can be smaller and fabricated less expensively, favorably driving down the cost of the overall phased array. Details of illustrative embodiments are discussed below.

Figure 1:
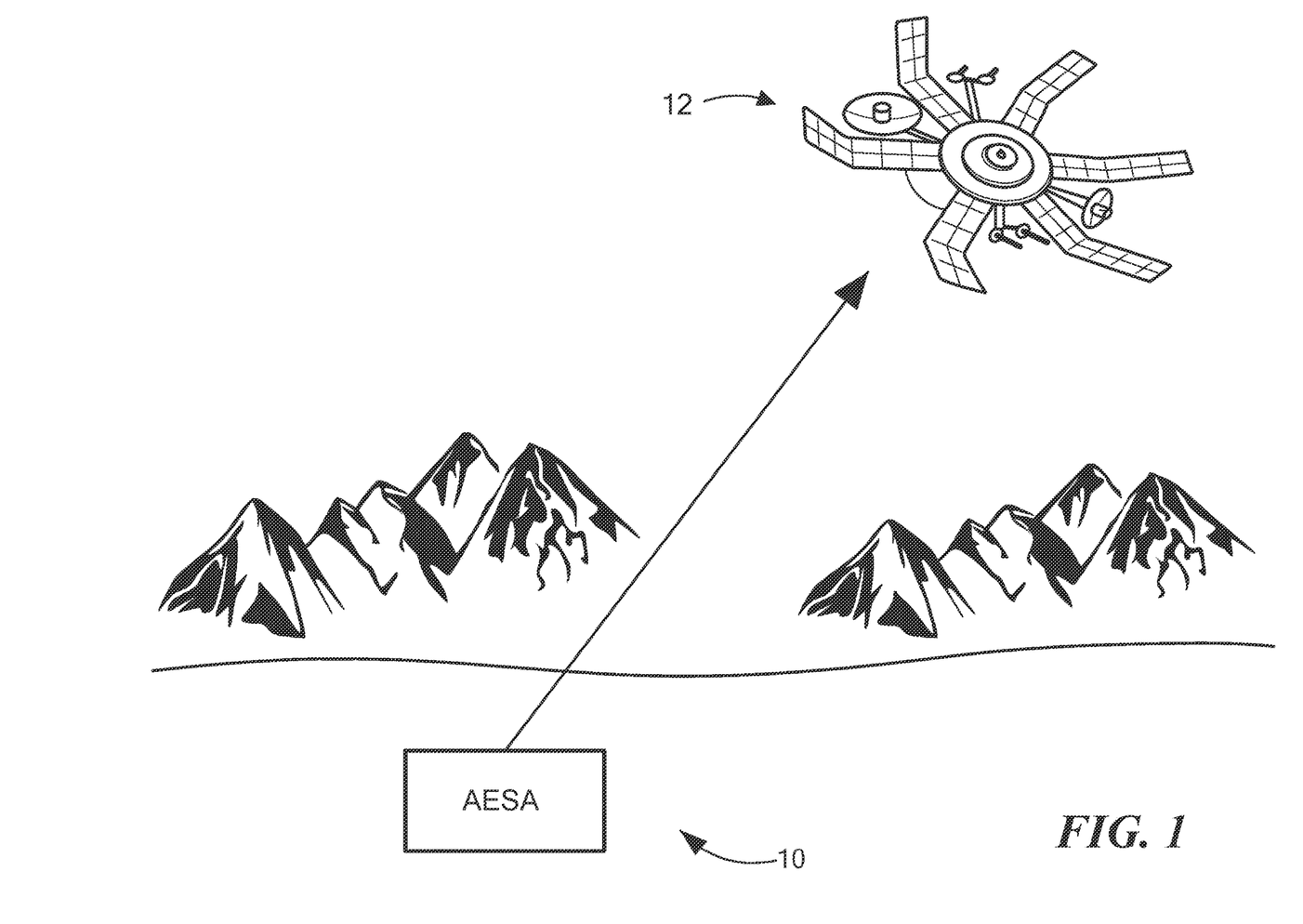
FIG. 1 schematically shows an active electronically steered antenna system ("AESA system") configured in accordance with illustrative embodiments of the invention and communicating with a satellite.

FIG. 1 schematically shows an active electronically steered antenna system ("AESA system 10") configured in accordance with illustrative embodiments of the invention and communicating with an orbiting satellite 12. A phased array (discussed below and identified by reference number "10A") implements the primary functionality of the AESA system 10. Specifically, as known by those skilled in the art, the phased array 10A forms one or more of a plurality of electronically steerable beams that can be used for a wide variety of applications. As a satellite communication system, for example, the AESA system 10 preferably is configured operate at one or more satellite frequencies. Among others, those frequencies may include the Ka-band, Ku-band, and/or X-band.

The satellite communication system may be part of a cellular network operating under a known cellular protocol, such as the 3G, 4G, or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 (implementing the noted phased array 10A) in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

Figure 2A:
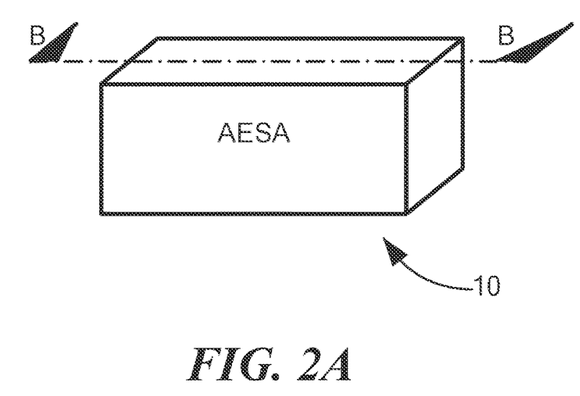
FIGS. 2A and 2B schematically show generalized diagrams of an AESA system that may be configured in accordance with illustrative embodiments of the invention.
Figure 2B:
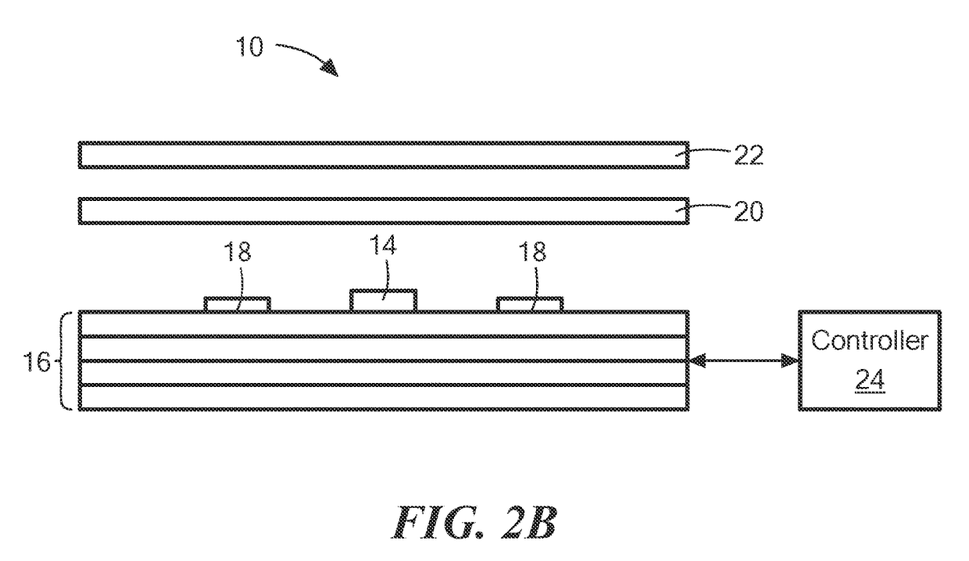

FIGS. 2A and 2B schematically show generalized diagrams of the AESA system 10 configured in accordance with illustrative embodiments of the invention. Specifically, FIG. 2A schematically shows a block diagram of the AESA system 10, while FIG. 2B schematically shows a cross-sectional view of a small portion of the same AESA system 10 across line B-B. This latter view shows a single silicon integrated circuit 14 (controlling elements 18, discussed below) mounted onto a substrate 16 between two transmit and/or receive elements 18, i.e., on the same side of a supporting substrate 16 and juxtaposed with the two elements 18. In alternative embodiments, however, the integrated circuit 14 could be on the other side/surface of the substrate 16. The phased array 10A also has a polarizer 20 to selectively filter signals to and from the phased array 10A, and a radome 22 to environmentally protect the phased array 10A. A separate antenna controller 24 (FIG. 2B) electrically connects with the phased array 10A to calculate beam steering vectors for the overall phased array 10A, and to provide other control functions.

Figure 3A:
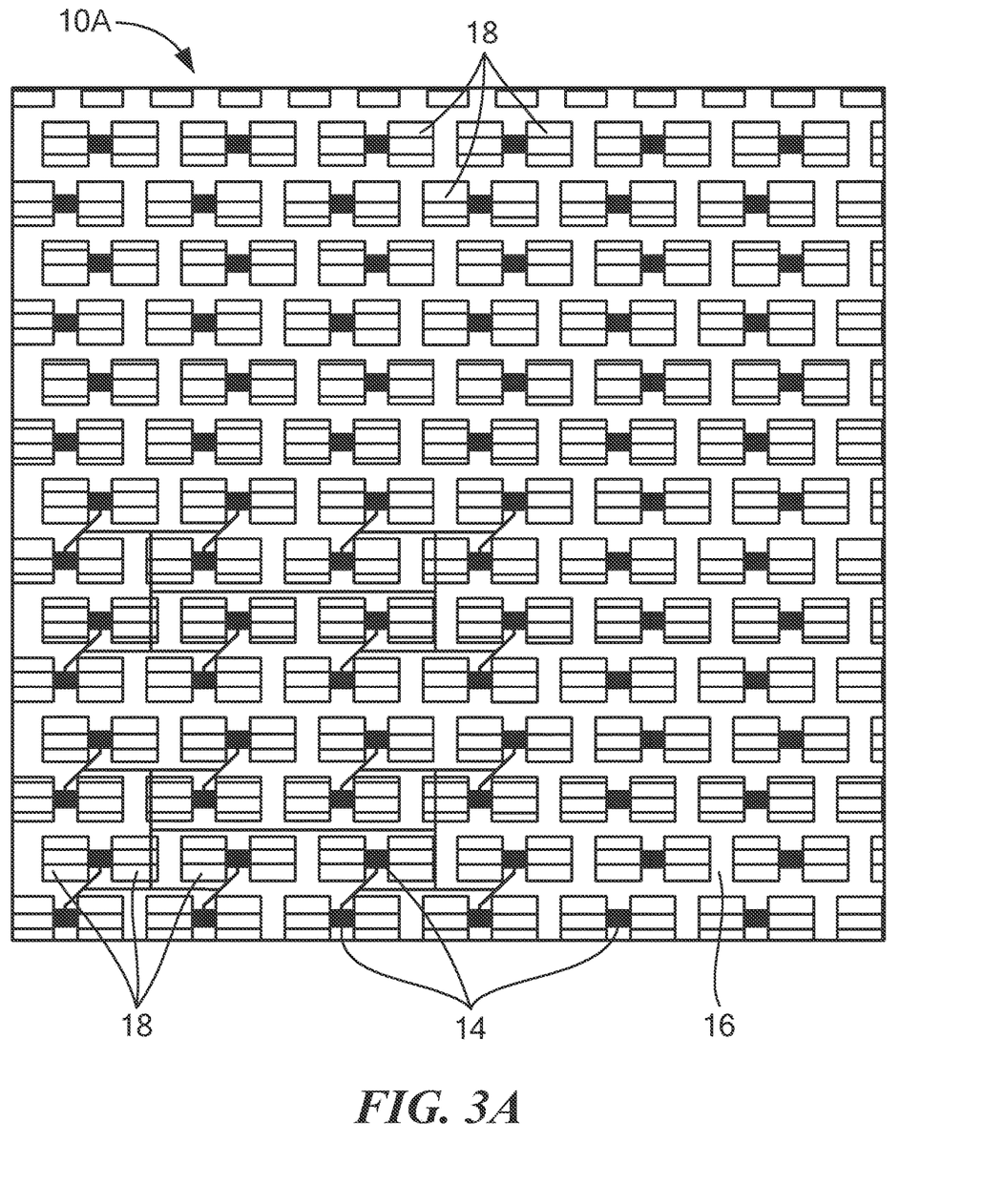
FIG. 3A schematically shows a plan view of a laminar printed circuit board portion of an AESA configured in accordance with illustrative embodiments of the invention.

FIG. 3A schematically shows a plan view of a primary portion of an AESA system 10 that may be configured in accordance with illustrative embodiments of the invention. In a similar manner, FIG. 3B schematically shows a close-up of a portion of the phased array 10A of FIG. 3A.

Specifically, the AESA system 10 of FIG. 3A is implemented as a laminar phased array 10A having a laminated printed circuit board 16 (i.e., acting as the substrate and also identified by reference number "16") supporting the above noted plurality of elements 18 and integrated circuits 14. The elements 18 preferably are formed as a plurality of square or rectangular patch antennas oriented in a triangular patch array configuration. In other words, each element 18 forms a triangle with two other adjacent elements 18. When compared to a rectangular lattice configuration, this triangular lattice configuration requires fewer elements 18 (e.g., about 15 percent fewer in some implementations) for a given grating lobe free scan volume. Other embodiments, however, may use other lattice configurations, such as a pentagonal configuration or a hexagonal configuration. Moreover, despite requiring more elements 18, some embodiments may use a rectangular lattice configuration. Like other similar phased arrays, the printed circuit board 16 also may have a ground plane (not shown) that electrically and magnetically cooperates with the elements 18 to facilitate operation.

Figure 3B:
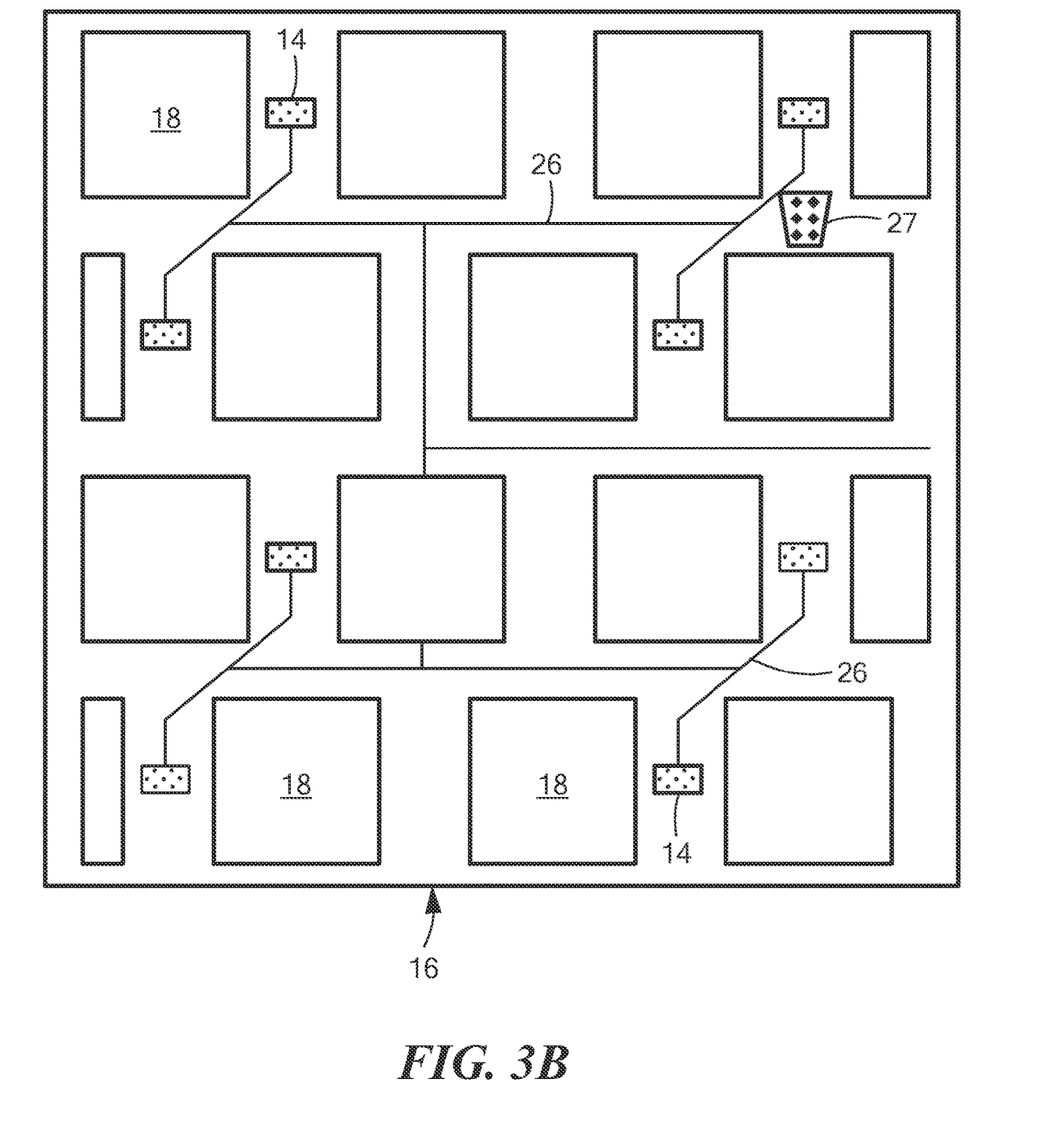
FIG. 3B schematically shows a close-up of a portion of the laminated printed circuit board of FIG. 3A.

Indeed, the array shown in FIGS. 3A and 3B is a small phased array 10A. Those skilled in the art can apply principles of illustrative embodiments to laminar phased arrays 10A with hundreds, or even thousands of elements 18 and integrated circuits 14. In a similar manner, those skilled in the art can apply various embodiments to smaller phased arrays 10A.

Figure 6:
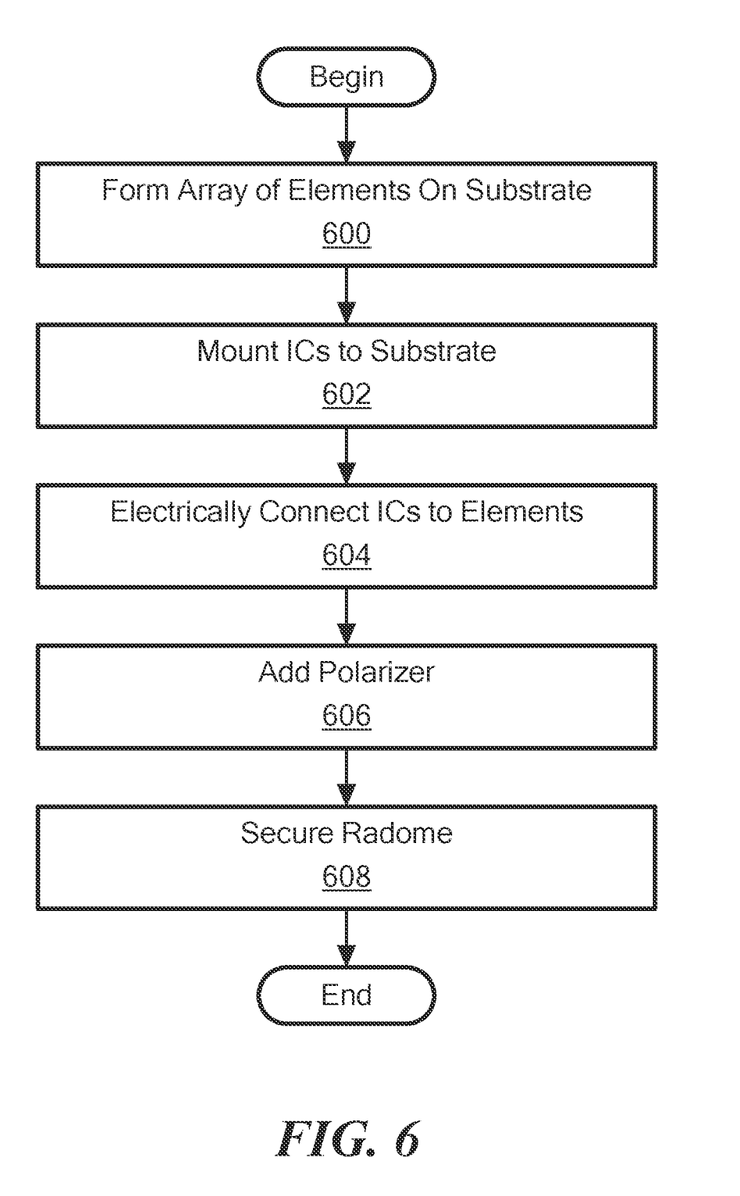
FIG. 6 shows a process of forming an AESA system in accordance with illustrative embodiments of the invention.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. As discussed below with regard to FIG. 6, illustrative embodiments may form the patch antennas using conventional semiconductor fabrication processes, such as by depositing one or more successive metal layers on the printed circuit board 16. Accordingly, using such fabrication processes, each radiating element 18 in the phased array 10A should have a very low profile.

The phased array 10A can have one or more of any of a variety of different functional types of elements 18. For example, the phased array 10A can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A can be in either a transmit mode, or a receive mode. The noted controller 24 at least in part controls the mode and operation of the phased array 10A, as well as other array functions.

The AESA system 10 has a plurality of the above noted integrated circuits 14 (mentioned above with regard to FIG. 2B) for controlling operation of the elements 18. Those skilled in the art often refer to these integrated circuits 14 as "beam steering integrated circuits." Prior art beam steering integrated circuits known to the inventors took up a lot of real estate on the printed circuit board 16. This is contrary to one general goal of maximizing the surface area of the elements 18 on the front face of the substrate 16. To solve this problem, those in the art relegated prior art integrated circuits known to the inventors to the opposite side of the circuit board 16—i.e., the side opposite the elements 18. While it may have helped maximize/optimize element area, it caused certain noise issues due to the relatively long transmission line to the elements 18. The inventors recognized both of these problems and, consequently, modified the phased array 10A, and the integrated circuits 14, to enable the integrated circuits 14 to be mounted on the same side as the elements 18; namely, on the front side of the printed circuit board 16.

To that end, each integrated circuit 14 preferably is configured with at least the minimum number of functions to accomplish the desired effect. Indeed, integrated circuits 14 for dual mode elements 18 are expected to have some different functionality than that of the integrated circuits 14 for the transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:
  phase shifting,
  amplitude controlling/beam weighting,
  switching between transmit mode and receive mode,
  output amplification to amplify output signals to the elements 18,
  input amplification for received RF signals (e.g., signals received from the satellite 12), and
  power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches. Additional details of the structure and functionality of integrated circuits 14 are discussed below with reference to FIG. 5A.

As noted above, the AESA system 10 preferably communicates with one or more orbiting satellites 12 and thus, uses satellite frequencies for that communication. Accordingly, the plurality of integrated circuits 14 preferably are configured operate the phased array 10A at one or more frequencies of the Ka-band, Ku-band, and/or X-band to communicate with at least one satellite 12. Of course, as satellite communication technology progresses, future implementations may modify the frequency bands of the integrated circuits 14 to communicate using new satellite frequencies.

The inventors recognized that the cost of the phased array 10A is directly related to the number of elements 18 and integrated circuits 14. Moreover, the number of integrated circuits 14 also has a direct relation to the size of the printed circuit board 16. In fact, the total number of integrated circuits 14 used and the size of the printed circuit board 16 accounts for a substantial majority of the total array costs. The inventors thus designed the array so that multiple elements 18 share the integrated circuits 14, thus reducing the required total number of integrated circuits 14. This reduced number of integrated circuits 14 correspondingly reduces the required size of the printed circuit board 16, which reduces the cost of the AESA system 10. In addition, more surface area on the top face of the printed circuit board 16 may be dedicated to the elements 18.

To that end, each integrated circuit 14 preferably operates on at least one element 18 in the array. For example, one integrated circuit 14 can operate on two or four different elements 18. Of course, those skilled in the art can adjust the number of elements 18 sharing an integrated circuit 14 based upon the application. For example, a single integrated circuit 14 can control two elements 18, three elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly reducing the required size of the printed circuit board 16.

As noted above, the dual-mode elements 18 may operate in a transmit mode, or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms (discussed below with regard to FIGS. 5A and 5B and noted above) of the integrated circuit 14. Instead, such embodiments may duplex at the element 18. This process can be performed by isolating one of the elements 18 between transmit and receive by an orthogonal feed connection. The inventors discovered that such a feed connection may eliminate about a 0.8 dB switch loss and improve G/T (i.e., the ratio of the gain or directivity to the noise temperature) by about 1.3 dB for some implementations. Additional details of the orthogonal feed connection are discussed below with regard to FIGS. 5A and 5B.

RF interconnect and/or beam forming lines 26 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each integrated circuit 14 preferably is packaged either in a flip-chipped configuration using wafer level chip scale packaging (WLCSP), or a traditional package, such as quad flat no-leads package (QFN package). While other types of packaging may suffice, WLCSP techniques are preferred to minimize real estate on the substrate 16.

In addition to reducing feed loss, using WLCSP techniques reduces the overall footprint of the integrated circuits 14, enabling them to be mounted on the top face of the printed circuit board 16 with the elements 18—providing more surface area for the elements 18. The inventors thus discovered that using WLCSP techniques, coupled with other innovations discussed herein, and able the system to operate within acceptable operation specifications.

It should be reiterated that although FIGS. 3A and 3B show the AESA system 10 with some specificity (e.g., the layout of the elements 18 and integrated circuits 14), those skilled in the art may apply illustrative embodiments to other implementations. For example, as noted above, each integrated circuit 14 can connect to more or fewer elements 18, or the lattice configuration can be different. Accordingly, discussion of the specific configuration of the AESA system 10 of FIG. 3A (and other figures) is for convenience only and not intended to limit all embodiments.

Figure 4:
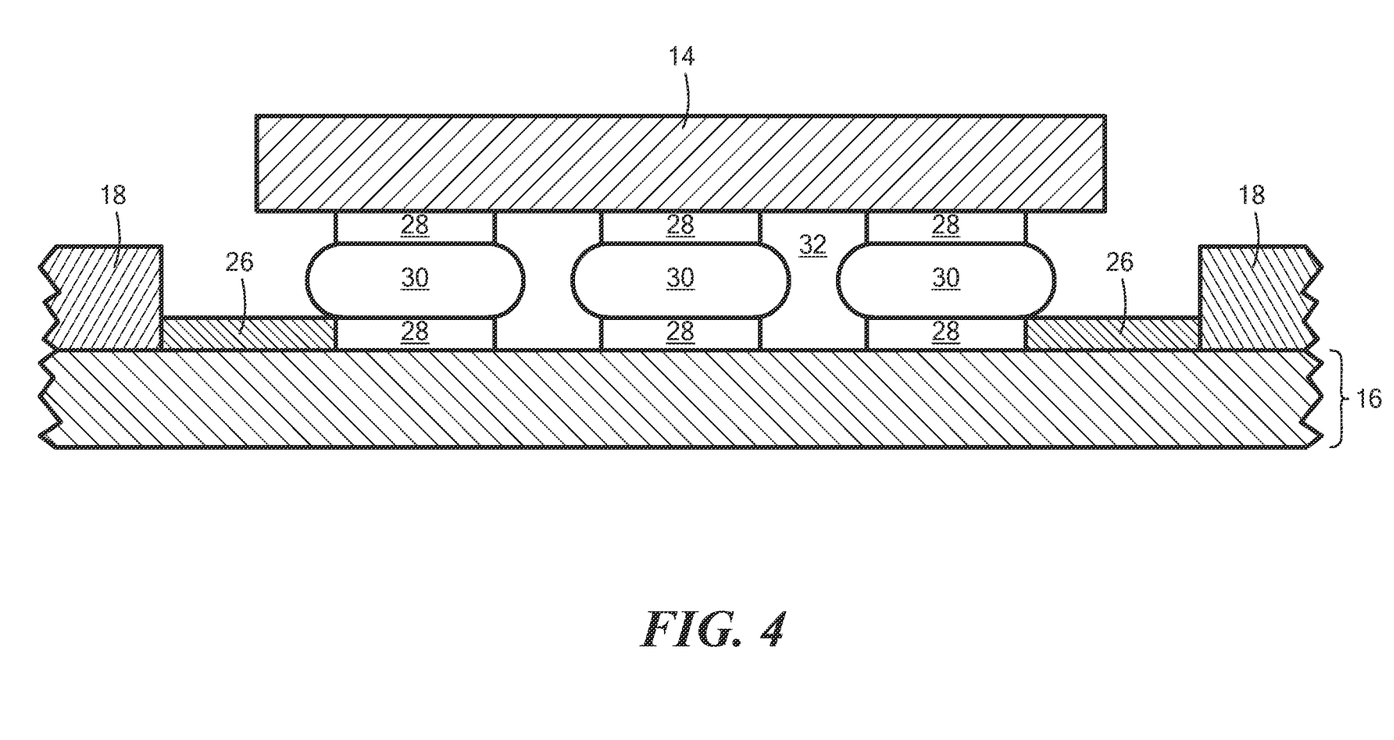
FIG. 4 schematically shows a cross-sectional view of the laminated printed circuit board of 3A to highlight the mounting of its integrated circuits.

FIG. 4 schematically shows a cross-sectional view of the layout of components on the laminated printed circuit board 16 of 3A to highlight the flip-chip mounting of its integrated circuits 14. The integrated circuit 14 in this drawing intentionally is enlarged to show details of a flip-chip mounting technique. Unlike techniques that permit input/output ("I/O") only on the edge of the integrated circuit 14, flip-chip mounting permits I/O on interior portions of the integrated circuit 14.

As shown, the integrated circuit 14 has a plurality of pads 28 aligned with a plurality of corresponding pads 28 on the printed circuit board 16. These opposing pads 28 on the integrated circuit 14 and the printed circuit board 16 may be considered to form pairs of pads 28. Solder 30 (e.g., solder balls) electrically connects each the pads in corresponding pairs of pads 28. Interconnect lines, traces, and other electrical interconnects on/in the printed circuit board 16 (e.g., lines 26) thus permit the integrated circuit 14 to communicate with other elements 18 through this electrical interface.

The embodiment shown in FIG. 4 forms a space or void (identified by reference number "32") between the bottom of the integrated circuit 14 (from the perspective of this drawing) and the top surface of the printed circuit board 16. This space 32 may remain an open void—containing no material. Some embodiments may take advantage of this extra space 32 to add further components, such as additional circuit elements, without requiring more circuit board space. Alternatively, this space 32 may contain fill material (not shown) for further stability and thermal management of the integrated circuit 14.

Other embodiments, however, still may use similar integrated circuits 14, but not use flip-chip mounting techniques. Instead, other mounting techniques may couple the integrated circuits 14 with the substrate 16. Among other things, those techniques may incorporate surface mounting, or wirebond mounting with the integrated circuit 14 rotated 180 degrees from the orientation of FIG. 4. Accordingly, discussion of flip chip mounting techniques is but one of a variety of different techniques that may be used with various embodiments of the invention.

Figure 5A:
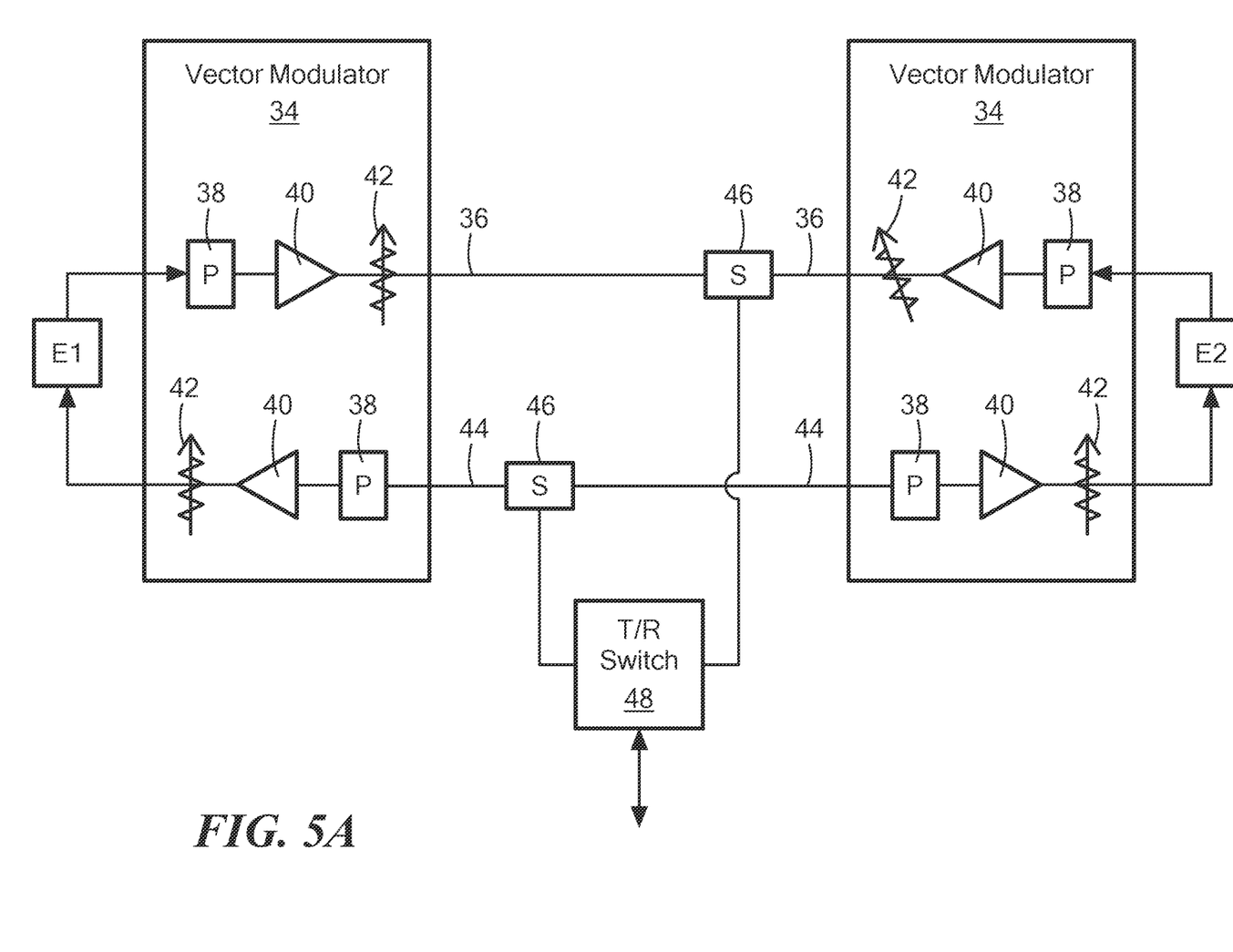
FIG. 5A schematically shows a circuit diagram of a portion of an integrated circuit mounted on the laminated printed circuit board of FIG. 3A.

As noted above, each integrated circuit 14 preferably has a minimal amount of circuitry to perform its required function. To that end, FIG. 5A schematically shows relevant portions of one integrated circuit 14 that may be configured in accordance with illustrative embodiments of the invention to control two elements 18. This exemplary integrated circuit 14 is shown and described as connected to two different elements 18 identified as element E1 and element E2. Of course, principles described with regard to FIG. 5A can apply equally to integrated circuits 14 controlling more than two elements 18, such as four elements 18.

As shown, the integrated circuit 14 has a first vector modulator 34 for controlling receipt and transmission of signals of a first element E1, and a second vector modulator 34 for controlling receipt and transmission of signals of a second element E2. The two vector modulators 34 each have a receive arm 36, coupled to their respective elements 18, for receiving signals. In FIG. 5A, because they transmit signals away from their elements E1 or E2, the receive arms 36 have arrows pointing away from their respective elements E1 and E2. To that end, each receive arm 36 has a phase shift modulator 38 (also referred to as a "phase shifter 38") for changing the phase of the incoming signals, and an amplifier 40 for amplifying the incoming signal. Among other things, the amplifiers 40 in the receive arms 36 are implemented as low noise amplifiers.

In illustrative embodiments, the amplifier 40 is a fixed gain amplifier. Accordingly, to control the amplification with more precision, each receive arm 36 also has an active gain controller 42 that increases or decreases the amplification provided by the amplifier 40. Alternatively, the amplifier 40 may be a variable gain amplifier. Accordingly, in that case, the active gain controller 42 may be omitted. As known by those skilled in the art, the amplifier(s) 40 and the phase shifter 38 cooperate to control incoming received signals.

In a corresponding manner, the two vector modulators 34 also each have a transmit arm 44 coupled to their respective elements 18. In an opposite manner to the receive arms 36, the transmit arms 44 in FIG. 5A have arrows pointing toward their respective elements 18. Each transmit arm 44 thus has a phase shifter 38 for changing the phase of the incoming signals, and an amplifier 40 for amplifying the incoming signal. The transmit arms 44 also may have an active gain controllers 42 if the transmit amplifiers 40 have a fixed gain. Alternatively, the transmit arms 44 may omit the active gain controllers 42 if the amplifier 40 is a variable gain amplifier. As known by those skilled in the art, the amplifier(s) 40 and the phase shifter 38 cooperate to steerably beam outgoing signals to other devices, such as to the satellite 12 of FIG. 1.

As noted above, the inventors recognized that reducing the overall footprint of the integrated circuit 14 should improve overall performance. To that end, the inventors discovered that if they provided a sufficient number of elements 18 in the AESA system 10, they could reduce the sizes of the phase shifters 38. For example, after testing, the inventors discovered that use of a 4 bit phase shifter 38 would provide sufficient results with a sufficient number of elements 18. The 4 bit phase shifter 38 thus provides up to 16 different vectors for transmitting a beam from a given element. In illustrative embodiments, each of the 16 different vectors is substantially evenly partitioned between zero and 360 degrees (e.g., 0 degrees, 22.4 degrees, 45 degrees, etc.). Other embodiments, however, may use smaller phase shifters 38 (e.g., 3 bit phase shifters 38) or larger phase shifters 38 (e.g., 5 or 6 bit phase shifters 38). Again, this number should be coordinated with the number of elements 18, as well as the gain of the amplifiers 40.

The inventors further discovered that the receive and transmit arms 36 and 44 of the vector modulators 34 could use relatively low gain amplifiers 40 if they appropriately selected of other element parameters. For example, the amplifiers 40 may have active gain control from 1 dB up to 3 dB, 4 dB, 5 dB, or greater (e.g., 6 dB). Again, low gain amplifiers 40 used in this application should further reduce the size of the integrated circuit 14.

The receive arms 36 and the transmit arms 44 may be considered to be "side arms" that combine and/or distribute signals at a summation point (also referred to as a "splitter" when splitting signals). Specifically, the two receive arms 36 meet at a receiving summing node 46A that combines the received signals from both the first and second elements 18. In a corresponding manner, the two transmit arms 44 also meet at a transmitting summing node 46B that, in an opposite manner to that of the receiving summing node 46A, distributes the transmit signals of the first and second elements 18 for transmission. Among other things, the summing nodes 46 may be implemented as a compact Wilkinson power divider/summer, which, as its name suggests, distributes/divides and/or sums signals. Indeed, the summing nodes 46 may be implemented by other active components and thus, a Wilkinson power divider/summer is but one example.

In addition to connecting with the side arms, each summing node 46A also connects with a main arm (aka "common arm") that itself may have an amplifier and/or active gain controller (not shown). In illustrative embodiments, the gain of the amplifier in the main arm is greater than those in the side arms. The main arm also has a switch 48 that switches between the transmit mode to the receive mode.

Figure 5B:
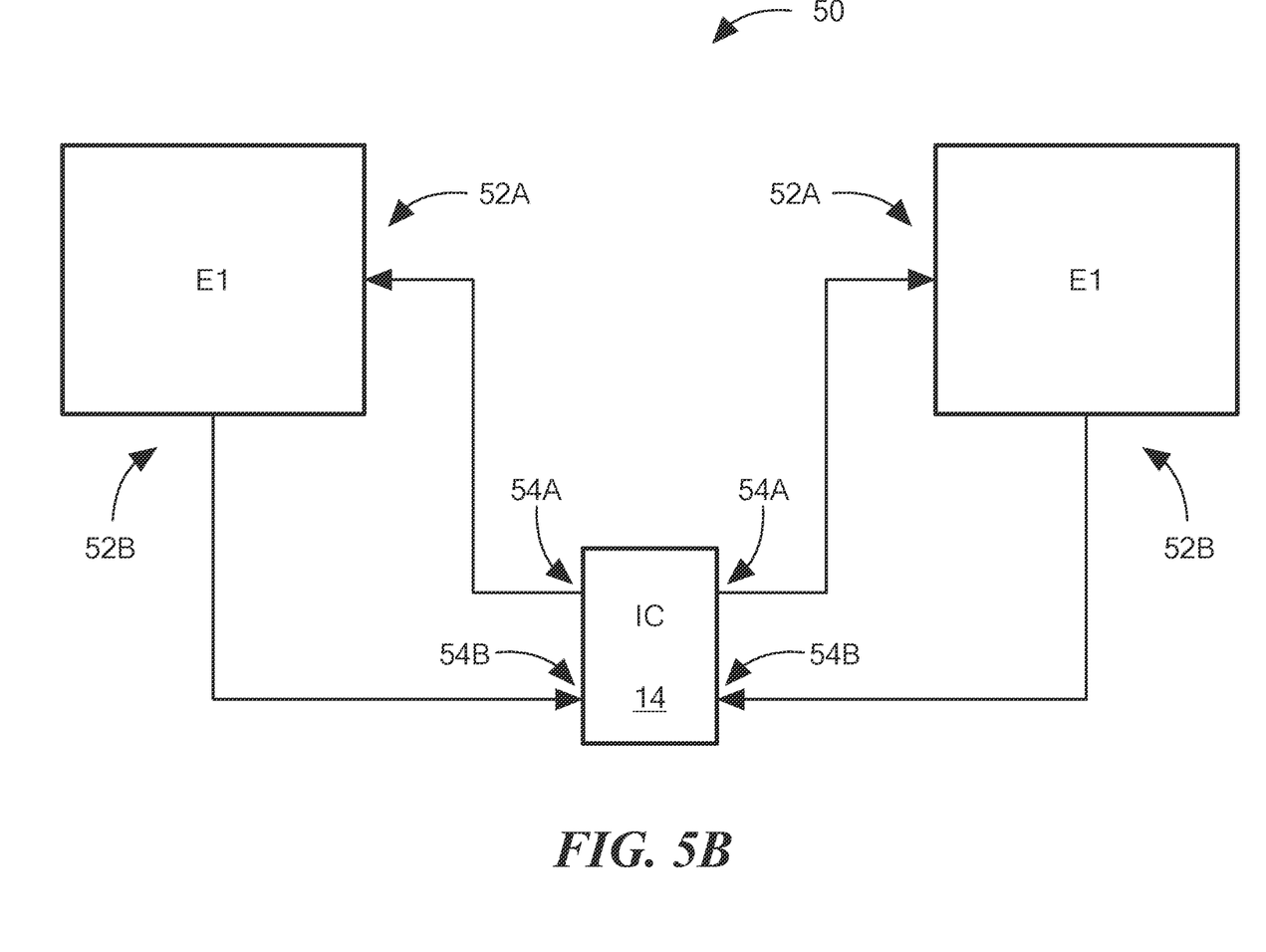
FIG. 5B schematically shows a generalized diagram of a single element set in illustrative embodiments.

Illustrative embodiments preferably do not have switches on the side arms. To that end, the transmit and receive sides of each vector modulator 34 preferably are physically coupled with adjacent sides of its element 18. FIG. 5B shows this coupling with one generalized beam steering integrated circuit 14. Specifically, the elements 18 are sized and oriented so that, from side-to-side, they are about half the size of one anticipated wavelength of the signals being transmitted and received. In that case, the opposite sides will be about 180 degree out of phase with each other. Adjacent sides, however, are about 90 degrees out of phase with each other. In this manner, the transmit arms 44 may be considered to be polarized a first way, while the receive arms 36 may be considered to be polarized a second, orthogonal way. For example, the transmit arms 44 may be considered to be "vertically polarized" while the receive arms 36 may be considered to be "horizontally polarized."

Accordingly, the receive arms 36 in FIG. 5A connect with a top portion of their respective elements 18, while the transmit arms 44 of FIG. 5A connect with a side (orthogonal) portion of their respective elements 18. Those in the art recognize, however, that the receive and transmit arms 36 and 44 may be physically coupled with other adjacent sides to accomplish the same result. Indeed, other embodiments may polarize the receive and transmit arms 36 and 44 differently. As such, the specific polarization discussed above is but one example and not intended to limit various embodiments. Alternative embodiments may use other polarizations (e.g., non-orthogonal).

When coupled as shown, illustrative embodiments avoid the need for a switch on the side arms. Moreover, as noted above, using a duplexing/diplexing signal for transmit and receive further aids in this goal. For example, illustrative embodiments may use time division duplex/diplex waveforms or frequency division duplex/diplex waveforms to both transmit and receive signals. In that case, to permit asymmetric transmit and receive data transmission, the transmit and receive signals may be allocated to different time slots in the same frequency band. For example, one or more of the elements 18 may couple with a frequency diplexer (not shown) that splits its relevant signal into a first frequency signal and a second frequency signal. Each of the generated frequency signals is then routed to its own independent circuit that either receives or transmits to or from the element 18.

The duplex/diplex waveforms may be generated in a number of different ways. In some embodiments, the integrated circuits 14 are configured to produce those waveforms. In other embodiments, one or more diplexers or duplexers on the substrate 16 at least in part produce those waveforms. FIG. 3B schematically shows one such diplexer or duplexer, identified by reference number 27. This diplexer/duplexer 27 communicates with other components, such as the integrated circuits 14, using the transmission lines (e.g., traces, vias, lines, etc.) on the substrate 16.

During operation, the switch 48 in the main arm first may be set to the transmit mode. Accordingly, the main arm receives a transmit signal through the switch. Next, that signal is distributed to the two transmit arms 44 through the transmitting summing node 46B. In this capacity, the transmitting summing node 46B acts like a distribution node as it distributes the signal to be transmitted to each side arm. Next, each transmit arm 44 (in the respective vector modulators 34) then shifts and amplifies its received signal as needed, and transmits that conditioned signal through its respective element 18 to the orbiting satellite 12.

After the transmission process is completed, the switch 48 on the main arm may be actuated to the receive mode. Accordingly, each receive arm 36 shifts and amplifies the signal received by its respective element E1 or E2. The receiving summing node 46A then sums or combines these two conditioned signals to produce a combined signal that is forwarded to other components through the switch 48 in the main arm.

Of course, it should be noted that the specific configuration of elements 18 in FIGS. 5A and 5B is but one of a wide variety of different configurations to accomplish the desired effect. Accordingly, when implementing various embodiments, those skilled in the art can add other components, remove components, or rearrange the noted components. The specific configuration of FIGS. 5A and 5B therefore is intended to be illustrative and not intended to limit various embodiments the invention.

In illustrative embodiments, the elements 18 and integrated circuits 14 may be considered to be organized into a plurality of "element sets 50" that cooperate to receive and transmit signals to/from the phased array 10A. For example, FIG. 5B generally shows a schematic view of a simple two element set 50. In a manner similar to the element set of FIG. 5A, this element set 50 includes a single integrated circuit 14 that controls a pair of elements E1 and E2. Unlike the implementation of FIG. 5A, however, this implementation couples the receive arms 36 with the bottoms of the elements E1 and E2 (from the perspective of FIG. 5B), and the transmit arms 44 with the sides of the elements E1 and E2.

The elements E1 and E2 of FIG. 5B (like those in FIG. 5A) thus may be considered to have respective element transmit and element receive interfaces 52A and 52B. In a corresponding manner and as noted above, the integrated circuit 14 is considered to have two IC transmit interfaces and two IC receive interfaces 54A and 54B. For example, each of the noted IC interfaces 54A and 54B may be implemented as pads or pins on the integrated circuits 14. One of the IC receive interfaces 54B is electrically connected/coupled to the element receive interface 52B of element E1, while the other IC receive interface 54B is electrically connected/coupled to the element receive interface 52B of element E2.

Similarly, one of the IC transmit interfaces 54A is electrically connected/coupled to the element transmit interface 52A of element E1, while the other IC transmit interface 54A is electrically connected/coupled to the element transmit interface 52A of element E2. Those connections may be made in any of a variety of ways, such as by using a transmission line integral with the substrate 16 (e.g., a trace or beam forming line) or via wirebonds. Accordingly, this or another technique physically connects the respective interfaces 52A and 52B of the elements 18 with the interfaces 54A and 54B of the integrated circuit 14.

In preferred embodiments, the element interfaces 52A and 52B each are positioned about at the middle of its respective edge/side. For example, as in FIG. 5B, the element receive interface 52B of element E1 may be about at the middle of the bottom edge/side of element E1 (from the perspective of the drawings). In a similar manner, the element transmit interface 52A of element E1 may be about at the middle of the right edge/side of element E1. In other embodiments, however, the element interfaces 52A and 52B may be closer to one end of an edge/side. It also should be pointed out that like illustrative embodiments, the edges/sides of the elements E1 and E2 in FIG. 5B are physically orthogonal to their adjacent edges/sides. For example, the bottom edge/side of element E1 is physically orthogonal to its adjacent right and left edges/sides.

Accordingly, because they are polarized out of phase, the element interfaces 52A and 52B effectively isolate the receive and transmit signals. As noted above, to further isolate the receive and transmit signals, the integrated circuits 14 preferably generate time or frequency division diplex or duplex waveforms. For example, the integrated circuits 14 preferably use half duplex (half-wave duplex) waveforms to alternate between transmit and receive modes. Using such a waveform should help ensure that the transmit signal does not distort the much lower power receive signal.

During operation, the elements E1 and E2 should be synchronized so that their respective transmit signals are in the same transmit polarization (e.g., a vertical polarization). In a similar manner, the elements E1 and E2 also preferably are synchronized so that their respective receive signals are in the same receive polarization (e.g., a horizontal polarization). In illustrative embodiments, all element sets are synchronized so that all elements in the phased array 10A transmit with the same transmit polarization, and receive with the same receive polarization. This ensures that the phased array generates a single beam and receives a single beam.

It should be noted that FIG. 5B is schematic and does not show other features. For example, the integrated circuit 14 may have more pins or pads, which may have different or similar functions to those described above. Among other things, those functions may include interfaces 54A and 54B for other elements 18 (if the element set 50 includes more than two elements 18), power input, ground, and communication with other components in the AESA system 10. As another example, the element interfaces 52A and 52B and the integrated circuits 14 may be physically at different locations than those shown. Accordingly, the specific implementation of FIG. 5B is illustrative and not intended to limit various other embodiments.

FIG. 6 shows a process of forming the phased array 10A/AESA system 10 in accordance with illustrative embodiments of the invention. It should be noted that this process is substantially simplified from a longer process that normally would be used to form the AESA system 10. Accordingly, the process of forming the AESA system 10 is expected to have many steps, such as testing steps, soldering steps, or passivation steps, which those skilled in the art may use.

In addition, some of the steps may be performed in a different order than that shown, or at the same time. Those skilled in the art therefore can modify the process as appropriate. Moreover, as noted above and below, the discussed materials and structures are merely examples. Those skilled in the art can select the appropriate materials and structures depending upon the application and other constraints. Accordingly, discussion of specific materials and structures is not intended to limit all embodiments.

The process of FIG. 6 begins at step 600, which forms the array of elements 18 on the substrate 16/printed circuit board 16. As noted above, the elements 18 preferably are formed from metal deposited onto the substrate 16 in a triangular lattice. This step also may form pads 28 and transmission lines 26 on the printed circuit board 16 to extend to the elements 18 (from the pads 28). As discussed below, these lines 26 electrically connect the integrated circuits 14 with the elements 18.

In preferred embodiments, the elements 18 are spaced apart from each other as a function of the wavelength of the signals expected to be transmitted and received by the AESA system 10. For example, the distances between the elements 18 may be spaced apart a distance equal to between 40-60 percent of the wavelength of the relevant signals. Some embodiments, however, may vary the spacing of the elements 18. See, for example, provisional U.S. Patent Application No. 62/376,442, filed on Aug. 18, 2016 and entitled, "Hybrid Laminated Phased Array," for further spacing and other details of similar embodiments. The disclosure of that provisional patent application (U.S. Patent Application No. 62/376,442) is incorporated herein, in its entirety, by reference.

Those skilled in the art can select the appropriate numbers of elements 18, based upon the application. Specifically, a given application may require a specified minimum equivalent isotropically radiated power ("EIRP") for transmitting signals. In addition, that same application may have a specified minimum G/T for receiving signals. Thus, step 600 may form the array to have a minimum number of elements 18 to meet either or both the EIRP and the G/T requirements of the application. For example, after establishing the feed loss and the noise figure of the receive amplifier 40 of the vector receive arms 36, one in the art can set the array size to a desired G/T. Of course, the phased array 10A may have more elements 18 beyond that minimum number.

Other embodiments may use other requirements for selecting the appropriate number of elements 18. Accordingly, discussion of the specific means for selecting the appropriate number of elements 18, and their spacing, is for descriptive purposes only and not intended to limit various embodiments of the invention.

At step 602, the process mounts the integrated circuits 14 to the printed circuit board 16/substrate 16. To that end, as noted above, when using WLCSP integrated circuits 14, illustrative embodiments may use conventional flip-chip mounting processes. Such a process directly electrically connects the integrated circuits 14 to the elements 18 (step 604). To that end, such embodiments may deposit solder paste (e.g., powdered solder and flux) on the pads 28 of the printed circuit board 16, and position the integrated circuits 14 on their respective board pads 28. Then, the printed circuit board 16 may be heated (e.g., using a reflow oven or process) to physically and electrically couple the pads 28 with the solder 30.

Some embodiments that do not use flip-chip mounted WLCSP integrated circuits 14, however, may require the additional step of step 604 to electrically connect the integrated circuits 14 to the elements 18. For example, a wirebond operation may be required to solder wirebonds between the integrated circuits 14 and the elements 18.

The process concludes by adding the polarizer 20 (step 606) and securing the radome 22 (step 608) to the apparatus in a conventional manner.

Accordingly, the inventors discovered that using the two interfaces 54A and 54B on the integrated circuit 14 to communicate differently polarized signals with the two interfaces 52A and 52B of the element 18 eliminates the need for certain switches in the integrated circuit 14. Such an optimization consequently reduces the footprint of the integrated circuit 14, while still ensuring appropriate isolation between transmit and receive signals. Importantly, this improvement should reduce the cost of producing the phased array 10A.

Although the above discussion discloses various exemplary embodiments of the invention, it should be apparent that those skilled in the art can make various modifications that will achieve some of the advantages of the invention without departing from the true scope of the invention.

What is claimed is:

1. A beamforming integrated circuit for controlling receipt and transmission of signals by a plurality of elements in a phased array, the beamforming integrated circuit comprising:
   a plurality of vector modulators, each vector modulator configured to control receipt and transmission of signals for a corresponding element of the plurality of elements and comprising:
      a receive circuit configured to set phase and gain parameters of incoming signals from the corresponding element;
      a transmit circuit configured to set phase and gain parameters for outgoing signals to the corresponding element; and
      separate receive and transmit element interfaces for respectively coupling the receive circuit and the transmit circuit to different polarization interfaces of the corresponding element so that incoming signals of a first polarization received by the corresponding element are provided to the receive circuit via the receive element interface and outgoing signals of a second polarization are provided by the transmit circuit to the corresponding element via the transmit element interface, the first and second polarizations being different so that the incoming signals and the outgoing signals are polarization-isolated from one another,
   the integrated circuit being configured to use time-division duplex waveforms to receive the incoming signals in designated receive time slots and transmit the outgoing signals in designated transmit time slots to further isolate the incoming signals and the outgoing signals.

2. A beamforming integrated circuit according to claim 1, wherein the different polarizations are orthogonal to one another.

3. A beamforming integrated circuit according to claim 1, wherein integrated circuit is configured to operate using 5G protocols.

4. A beamforming integrated circuit according to claim 1, wherein the integrated circuit is configured to operate at one or more satellite frequencies.

5. A beamforming integrated circuit according to claim 1, wherein the beamforming integrated circuit is configured to switch each vector modulator between a transmit mode and a receive mode without the use of a switch in the vector modulator.

6. A beamforming integrated circuit according to claim 1, wherein each vector modulator is configurable between:
   a first mode in which the incoming signals are received in a horizontal polarization and the outgoing signals are transmitted in a vertical polarization; or
   a second mode in which the incoming signals are received in the vertical polarization and the outgoing signals are transmitted in the horizontal polarization.

7. A beamforming integrated circuit according to claim 1, further comprising:
   common RF circuitry comprising a transmit signal path configured to provide common transmit signals to the vector modulators and a receive signal path configured to receive combined receive signals from the vector modulators.

8. A beamforming integrated circuit according to claim 7, further comprising:
   at least one signal divider through which the common transmit signals from the common RF circuitry are provided to the vector modulators; and
   at least one signal combiner through which output signals from the vector modulators are provided as the combined receive signals to the common RF circuitry.

9. A beamforming integrated circuit according to claim 8, wherein each signal divider is a Wilkinson signal divider and each signal combiner is a Wilkinson signal combiner.

10. A method for controlling receipt and transmission of signals by a plurality of elements in a phased array using a beamforming integrated circuit according to claim 1, the method comprising:
in a receive mode, receiving by at least one receive circuit, via the corresponding receive element interface, incoming signals of a first polarization from the corresponding element in designated receive time slots; and
in a transmit mode, transmitting by at least one transmit circuit, via the corresponding transmit element interface, outgoing signals of a second polarization to the corresponding element in designated transmit time slots, the first and second polarizations being different so that the incoming signals and the outgoing signals are polarization-isolated from one another.

11. A beamforming integrated circuit for controlling receipt and transmission of signals by a plurality of elements in a phased array, the beamforming integrated circuit comprising:
a plurality of vector modulators, each vector modulator configured to control receipt and transmission of signals for a corresponding element of the plurality of elements and comprising:
a receive circuit configured to set phase and gain parameters of incoming signals from the corresponding element;
a transmit circuit configured to set phase and gain parameters for outgoing signals to the corresponding element; and
separate receive and transmit element interfaces for respectively coupling the receive circuit and the transmit circuit to different polarization interfaces of the corresponding element so that incoming signals of a first polarization received by the corresponding element are provided to the receive circuit via the receive element interface and outgoing signals of a second polarization are provided by the transmit circuit to the corresponding element via the transmit element interface, the first and second polarizations being different so that the incoming signals and the outgoing signals are polarization-isolated from one another without the beamforming integrated circuit including a physical switch used to selectively couple the receive and transmit circuits to the corresponding element and decouple the receive and transmit circuits from the corresponding element.

12. A beamforming integrated circuit according to claim 11, wherein the different polarizations are orthogonal to one another.

13. A beamforming integrated circuit according to claim 11, wherein integrated circuit is configured to operate using 5G protocols.

14. A beamforming integrated circuit according to claim 11, wherein the integrated circuit is configured to operate at one or more satellite frequencies.

15. A beamforming integrated circuit according to claim 11, wherein each vector modulator is configurable between:
a first mode in which the incoming signals are received in a horizontal polarization and the outgoing signals are transmitted in a vertical polarization; or
a second mode in which the incoming signals are received in the vertical polarization and the outgoing signals are transmitted in the horizontal polarization.

16. A beamforming integrated circuit according to claim 11, wherein the integrated circuit is configured to use time-division duplex waveforms to receive the incoming signals in a first polarization and transmit the outgoing signals in a second polarization different than the first polarization.

17. A beamforming integrated circuit according to claim 16, wherein the integrated circuit is configured to receive the incoming signals in designated receive time slots and to transmit the outgoing signals in designated transmit time slots.

18. A beamforming integrated circuit according to claim 11, wherein the integrated circuit is configured to frequency-division duplex waveforms to receive the incoming signals in a first polarization and transmit the outgoing signals in a second polarization different than the first polarization.

19. A beamforming integrated circuit according to claim 11, further comprising:
common RF circuitry comprising a transmit signal path configured to provide common transmit signals to the vector modulators and a receive signal path configured to receive combined receive signals from the vector modulators.

20. A beamforming integrated circuit according to claim 19, further comprising:
at least one signal divider through which the common transmit signal from the common RF circuitry is provided to the vector modulators; and
at least one signal combiner through which output signals from the vector modulators are provided as the combined receive signals to the common RF circuitry.

21. A beamforming integrated circuit according to claim 20, wherein each signal divider is a Wilkinson signal divider and each signal combiner is a Wilkinson signal combiner.

22. A method for controlling receipt and transmission of signals by a plurality of elements in a phased array using a beamforming integrated circuit according to claim 11, the method comprising: in a receive mode, receiving by at least one receive circuit, via the corresponding receive element interface, incoming signals of a first polarization from the corresponding element; and in a transmit mode, transmitting by at least one transmit circuit, via the corresponding transmit element interface, outgoing signals of a second polarization to the corresponding element, the first and second polarizations being different so that the incoming signals and the outgoing signals are polarization-isolated from one another without the receive and transmit circuits being selectively coupled to the corresponding element and decoupled from the corresponding element.

* * * * *